Oct. 31, 1950     R. D. CLEMSON     2,528,116
ROLLER FOR LAWN MOWERS
Filed July 16, 1946
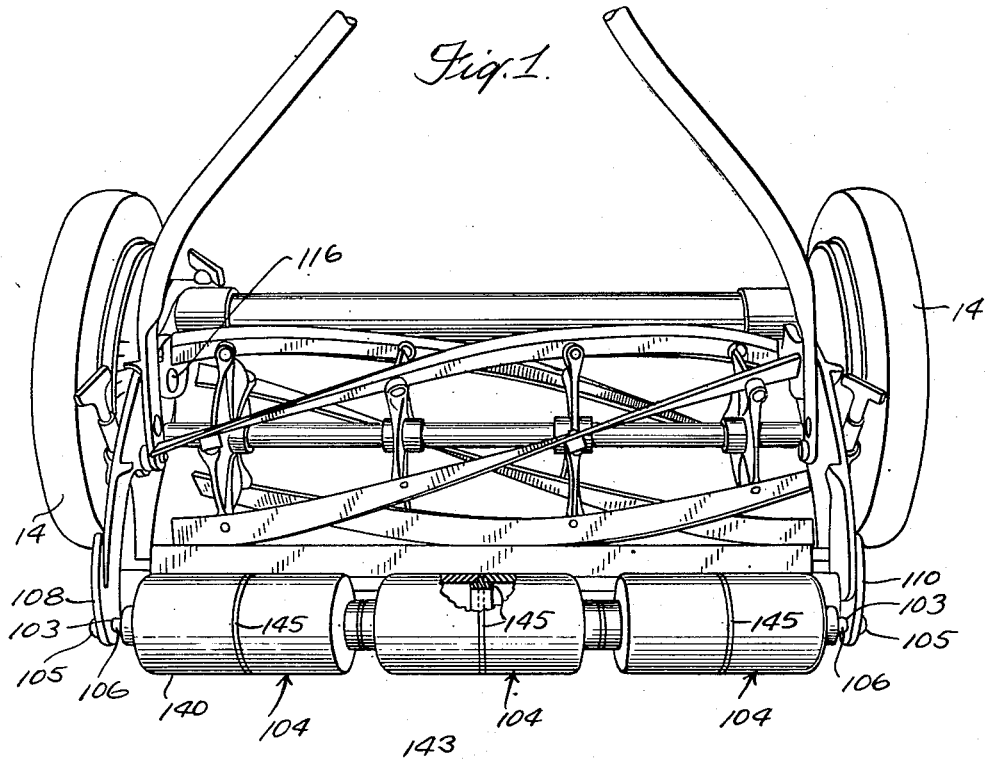
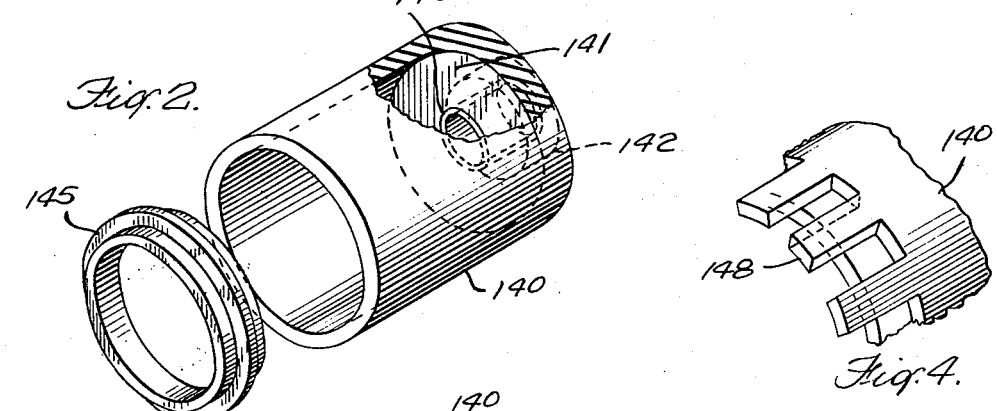
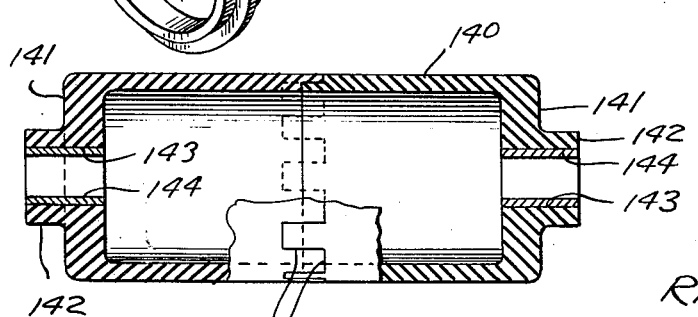
INVENTOR
RICHARD D. CLEMSON
BY
Blair, Curtis + Hayward
ATTORNEYS Patented Oct. 31, 1950

2,528,116

UNITED STATES PATENT OFFICE 2,528,116

ROLLER FOR LAWN MOWERS

Richard D. Clemson, Middletown, N. Y., assignor to Clemson Bros., Inc., Middletown, N. Y.

Application July 16, 1946, Serial No. 684,041

2 Claims. (Cl. 56—249)

This invention relates to rollers and particularly to rollers suitable for use in the construction of the ground rollers of lawn mowers.

Only in recent years have serious attempts been made so to redesign and improve lawn mowers as to do away with their needless weight, their clumsiness of manipulation and their tendency to get out of adjustment, while, at the same time, overcoming the difficulty of restoring proper adjustment when lost.

One of the problems in lawn mower design to which little attention has so far been paid is that of the construction of the ground roller. Although considerable attention has been directed to improvements in the adjustment of the ground roller, since such adjustment determines the depth of cut, the ground roller itself, up to the present time, has usually consisted merely of a wooden roller, of substantially the length of the bed knife of the machine, either turning on a fixed shaft or having pivots mounted in bearing openings in the adjusting frame.

It will be obvious that, although such a roller will probably satisfactorily perform its principal function of determining the depth of cut by determining the height of the bed knife from the ground, nevertheless, whenever the lawn mower deviates at all from a straight path so that one drive wheel of the machine is travelling faster than the other and therefore one end of the ground roller is travelling faster than the other, there will necessarily be a drag action of one end or the other of the ground roller, since, of course, one end of the integral roller cannot rotate faster than the other.

It will also be obvious that a ground roller made of solid wood, of a hardness sufficient to withstand the rough usage to which lawn mowers are subjected and of a diameter to insure easy rolling, will be needlessly heavy. Attempts have been made heretofore to substitute for the usual wooden rollers hollow metal rollers of the same general shape and design but this change has not resulted in any substantial saving in weight. Moreover, a metal roller, continuous from one side to the other of the lawn mower, interposes the same drag whenever the mower is not travelling in a straight line, since there can be no differential in the rotation speeds of the two ends of the roller.

A general object of the present invention is to provide a roller of improved construction, which is particularly adapted for use as a ground roller for lawn mowers, and particularly to provide a composite ground roller which has the necessary strength and resistance to wear required for the rough usage to which it is subjected and yet which will be so light, even in larger than usual diameters, as materially to reduce the overall weight of the lawn mower. At the same time the composite roller of the present invention, made of a plurality of individual and independently turnable rollers mounted on a common shaft, aims to overcome the drag incident to the use of the ordinary ground roller in that a roller at one end of the shaft may travel at a different speed from a roller at the other end when the lawn mower itself is not travelling in a straight line.

With the foregoing and other ends in view the invention contemplates the provision of a plastic roller made up of two molded cup-like elements of plastic composition having cylindrical outer surfaces and having bearing openings in the cup bottoms concentric with said cylindrical surfaces, said elements being secured together at their cup lips in such manner that the cylinder axes and the bearing openings are all in coaxial alignment. The resultant hollow roller, when made of a suitable plastic, such, for example, as cellulose acetate, can be formed with a comparatively thin cylinder wall and a sufficiently strong cup end to provide the desired bearing supporting strength. Such a roller also has very little weight and yet is strong enough and elastic enough to withstand the abuse to which ground rollers are subjected. Moreover, by making it sufficiently short so that a plurality of them may be mounted on a shaft of the length of the usual ground roller shaft and by so mounting them that they may turn freely independently of each other, a composite ground roller may be provided, of considerably less weight than existing ground rollers, which will not offer the drag of existing ground rollers to movements of the lawn mower in other than straight directions.

Other objects, features and advantages of the invention, to which reference has not hereinabove specifically been directed, will appear hereinafter when the following description and claims are considered in connection with the accompanying drawings, in which—

Figure 1 is a rear elevation, with parts in section, of a lawn mower having therein the improved ground roller construction of the present invention;

Figure 2 is a perspective phantom view of one of the two like molded plastic cups and the central disk, of which each roller is made up;

Figure 3 is a section through a roller similar to those shown in Figure 1, but showing a different structure for securing the parts together; and Figure 4 is a fragmentary perspective view showing the interdigitating rim used in Figure 3.

The invention is shown as employed in a lawn mower the ground roller of which is carried upon a secondary frame adjustable with respect to the main frame of the machine to vary the depth of cut, and this secondary frame comprises side members 108 and 110 pivoted on short studs 112 and 114, formed as enlarged shoulder portions of machine screws 116 and 118 which are screwed into the inner ends of the stud axles on which the driving wheels 14 are mounted, so that the roller frame swings about the axis of the driving wheels.

The ground roller frame side members 108 and 110 each has an extension beyond its pivot stud provided with a segment gear, the segment gears on the two extensions engaging with gear wheels on a shaft extending across the frame whereby simultaneous and equal raising or lowering of the two side frame members 108 and 110 may be brought about. At their rear ends the side frame members 108 and 110 are provided with openings 103 to receive machine screws 105 which screw into the ends of a roller-carrying shaft 106, sufficiently larger in diameter than the openings 103 so that the ends of the shaft, when secured by the screws 105, abut against the inner sides of the frame members 108 and 110. On the shaft 106 the three short ground rollers 104, which together make up the composite ground roller of the present invention, are mounted to turn freely. As shown, these three rollers, which make up the composite ground roller, are each of such length that together they do not quite fill the space between the side members 108 and 110 and thus are free to move longitudinally of the shaft 106 to a slight extent.

The novel individual roller construction of the present invention, as hereinabove suggested, is of plastic composition and the completed roller is preferably hollow. The plastic employed in making the roller may be any suitable commercial plastic having the required physical characteristics. Cellulose acetate has been found to be a suitable plastic for this purpose, the commercial form of this plastic employed in the illustrative embodiment of the invention being the Eastman Tenite. To facilitate manufacture of the hollow roller, two cups, preferably of substantially identical construction, such as shown in Figure 2, are formed by molding; each of these cups comprising, as shown, a cylindrical side wall 140 with an integral cup bottom 141 and a hub 142, at the center of the bottom, provided with a bearing opening 143 lined with bushing 144 concentric with the cylinder wall 140.

As shown in Figure 1, each of the rollers 104 is made up of two cylindrical cup sections 140 and an intermediate flanged ring or disk 145. Shoulders 146 of this ring serve to provide additional central support for the walls of the cylindrical cups 140, and by means of an adhesive or by heat and pressure, etc., to hold the edges of the cups together while the central flange 147 serves to secure the ring 145 in its proper position with respect to the two cup sections.

The edge of each cup 141 is preferably so formed that it will fit snugly onto the shoulder 146 against the corresponding flange 147 of ring 145 when these are brought together with the axes of the two cups in coaxial alignment. In other words, each cup preferably has its lip edge lying in a plane perpendicular to its cylindrical axis. To form the rollers shown in Figure 1 and in section in Figure 3, the lips of two identical cups are brought into and secured in coaxial relation to each other. Any suitable means may be employed for effecting the permanent union of the two cups, directly or through a ring such as 145, e. g., one of the strongly adhesive plastic cements.

As shown in Figure 3, each of the openings 146 in the hubs 144 is preferably provided with a metal bushing 148 to provide the desired bearing on the shaft 106.

From the foregoing description it will be seen that the present invention provides an improved roller construction, particularly suitable for use in the construction of ground rollers for lawn mowers, whether the ground roller comprise a single unit extending throughout the width of the machine or be made up, as in the preferred form of the invention herein shown, of a plurality of rollers mounted on a common shaft. It will further be seen that the roller of the present invention has the advantage over the rollers of the prior art that it is much lighter for the same diameter and length than prior art rollers, thus permitting its use in larger more freely rolling diameters, if desired, without increasing the weight of the machine and that, by reason of the elasticity of the material of which it is composed, the hollow construction of the roller, etc., it is better adapted to meet conditions of use which might result in permanent deformations in rollers of the prior art. It will also be seen that, in the composite roller construction herein shown, in which a plurality of these light plastic rollers are mounted on a common shaft and arranged to turn independently of each other, the invention provides an improved ground roller adapted to do away with the objectionable drag of the rollers of the prior art when the machine is travelling in other than straight lines. Moreover, by providing projecting hubs on the ends of the individual rollers of the composite ground roller, thus bringing about a slight endwise spacing of the main bodies of the rollers, and by rounding the end edges of the rollers, the entire composite roller construction has in it an adaptability to irregular movements of the machine not heretofore to be found in any ground roller construction.

It will be understood that the invention is not limited to the particular details of construction illustrated and described nor to a roller composed of the particular plastic referred to but that many changes in structural details may be made within the scope of the appended claims and other plastics may be found equally advantageous for use in the making of the improved roller, particularly some of the strong thermoplastic or thermosetting molding compositions, such as phenol aldehyde, alkyd type resins, vinyl type resins, other cellulose esters or ethers, etc.

Although I have found it advantageous to use a cementing ring such as is shown at 145 in Figures 1 and 2, and since this not only provides a secure joint with simple smooth-edged cups, but also provides a central reinforcement for the rollers, nevertheless it is to be understood that the juncture may be made in other ways. With certain thermoplastic compositions the simple circular-edged cups may be softened at their edges and pressed into a circumferential weld. Likewise, with compositions which are soluble to an adhesive condition, the edges may be softened by a solvent and similarly pressed together to produce an autogenous weld. Where these expedients are not feasible, strong cements may be used on the abutting faces. It is advantageous, however, to provide a lapped joint for additional strength; and this may be achieved by molding male and female edges on the respective cups. To this extent, the right and left members of a pair of interfitting cups, which form each of the rolls 104, would differ and therefore require separate handling.

A better arrangement is shown at Figures 3 and 4, wherein instead of male and female cups, each cup is made with segments having upper and lower protruding lips respectively, which when the cups are brought together, form lap-joints. In Figures 3 and 4, these are shown as relatively narrow segments, constituting interdigitating fingers. It will be understood, however, that the arcuate extent of these segments is not important, provided only that their respective extent and sequence in the inner and outer lips respectively coincide in such manner that a cup, when inverted against an identical cup, fits together into the desired half lap joints. These segments and recesses can be readily molded into the edge of the cup at the same time that the cup itself is formed.

I claim:

1. A roller for a lawnmower comprising a pair of hollow exteriorly cylindrical plastic cups each being partially closed at one end by an integral annulus extending radially inwardly from the outer surface of the cup, a boss of smaller diameter than the cup projecting axially outwardly from each annulus and defining a central bearing space concentric to the cylindrical surfaces of the cup, an annular ring having a central portion and axially extending flanges, the central portion having a diameter equal to the external diameter of the cups and the flanges having a diameter equal to the internal diameter of the cups, the other ends of said cups being bonded to opposite sides of said ring over the entire end surfaces of the other end of the cup and over an annular surface equal to the surface of one of the flanges.

2. A ground roller assembly for a lawnmower comprising a ground roller shaft and a ground roller comprised of a plurality of roller units mounted on said shaft in closely spaced relationship, each roller comprising a pair of hollow exteriorly cylindrical plastic cups each being partially closed at one end by an integral annulus extending radially inwardly from the outer surface of the cup, a boss of smaller diameter than the cup projecting axially outwardly from each annulus and defining a central bearing space concentric to the cylindrical surfaces of the cup, an annular ring having a central portion and axially extending flanges, the central portion having a diameter equal to the external diameter of the cups and the flanges having a diameter equal to the internal diameter of the cups, the other ends of said cups being bonded to opposite sides of said ring over the entire end surfaces of the other end of the cup and over an annular surface equal to the surface of one of the flanges.

RICHARD D. CLEMSON.

REFERENCES CITED

The following references are of record in the file of this patent:

UNITED STATES PATENTS

| Number | Name | Date |
| --- | --- | --- |
| 1,385,007 | Kerr | July 19, 1921 |
| 1,703,521 | Dremel | Feb. 26, 1929 |
| 1,733,133 | Roseman | Oct. 29, 1929 |
| 1,754,188 | Coldwell | Apr. 8, 1930 |
| 1,818,220 | Gratiot | Aug. 11, 1931 |
| 1,884,340 | Stegeman | Oct. 25, 1932 |
| 2,137,987 | Smith | Nov. 22, 1938 |
| 2,145,440 | George | Jan. 31, 1939 |